Nov. 17, 1959 CHAANG HUANG 2,913,704

MULTIPLE EMITTER MATRICES

Filed July 6, 1954 3 Sheets-Sheet 1

INVENTOR.
CHAANG HUANG
BY Lawrence Burns
ATTORNEY

Nov. 17, 1959 CHAANG HUANG 2,913,704

MULTIPLE EMITTER MATRICES

Filed July 6, 1954 3 Sheets-Sheet 2

INVENTOR.
CHAANG HUANG

BY Lawrence Burns,

ATTORNEY

INVENTOR.
CHAANG HUANG
BY Lawrence Brown,
ATTORNEY

United States Patent Office 2,913,704

Patented Nov. 17, 1959

2,913,704

MULTIPLE EMITTER MATRICES

Chaang Huang, Ipswich, Mass., assignor, by mesne assignments, to Sylvania Electric Products Inc., Wilmington, Del., a corporation of Delaware Application July 6, 1954, Serial No. 441,297

6 Claims. (Cl. 340—166)

The present invention relates to matrices for switching purposes, and in particular to transistor switching networks. In accordance with features of the invention, transistors of the current-multiplying type are advantageously employed in the establishment of a wide variety of switching matrices.

Networks or matrices are known wherein a number of pairs of controlled leads are interconnected to a larger number of individual channels. Upon energization of one control lead of each pair in relation to the other, all but one of the individual channels can be disabled, thus effecting a selection of a single channel. The paired leads are energized in various combinations to select the several channels, each channel being individually selected by a related combination. Such matrices as circuit elements involve no moving contacts and assure practically instantaneous response to changing conditions of energization. In that the matrix is notable for its high speed of achieving circuit conditioning, it finds widespread application in telemetering systems and in computing organizations.

Known rectangular and pyramidal matrices employing resistors or crystal diodes are limited as a practical matter to a relatively modest number of channels. For example, in a rectangular rectifier matrix, the number of connections, the number of rectifying elements and the required number of blocking rectifiers may become prohibitive from the standpoint of proper circuit functioning, resulting in unsatisfactory discrimination between a selected line and other lines.

It is an object of the present invention to provide novel transistor matrices. Specifically, within the contemplation of the invention is the simplification of matrices and the improvement of their performance.

It is another object of the present invention to provide a matrix embodying a minimum number of switching devices for achieving selective interaction between a large number of lines or signal sources.

It is a further object of the present invention to provide a transistor matrix which is adapted for presentations and switching functions requiring expression on a multiple-coordinate system of notation. In accordance with this feature of the invention, a two-coordinated system of presentation, dimensionally characterizing a single plane can be established; further a three-coordinate presentation, dimensionally characterising a cubic or three dimensional presentation can likewise be established; still larger numbers of coordinate presentations are attainable in accordance with principles hereinafter set forth.

A still further object of the present invention is the provision of a wide variety of matrix circuits generally embodying the desirable attributes of transistor circuitry, prominently reliability, reduction in power use due to low operating voltages and inherent low internal resistance, and size reduction, compactness is an important criteria in promoting utilization for complex computing circuits and like installations.

Numerous applications may be found for a switching circuit or matrix capable of memory storage for short, intermediate or long periods. Matrices or switching circuits capable of retention of information for subsequent use, despite the removal of control or input signals, will hereinafter be referred to as "memory" matrices. The use of such memory matrices in the fields of radio telephony, radio telegraphy, telemetering and generally in other types of signal transmission, storage, switching and control are too numerous to recount.

A further object of the present invention is to provide a memory matrix or memory switching circuit. Specifically, the invention contemplates simplified transistor matrices capable of performing a memory or storage function. Advantageously these transistor matrices exhibit extreme flexibility in respect to the manner of coordinate presentation and in the number of individual inputs or controls for each coordinate of the presentation.

Although the forms of the invention to be described will demonstrate the usefulness of the present transistor matrices, advantageously capable of memory or storage, at high speed switching or selection networks, it should be expressly understood that the foregoing uses are purely illustrative. For example, the present matrices will find application in signal transmission networks serving as distributors and collectors.

The above and still further objects, features and advantages of the present invention will be best appreciated by reference to the following detailed description of several illustrative embodiments of the invention, when taken in conjunction with the accompanying drawing, wherein.

Preliminary to detailed reference to the several illustrative embodiments of the invention, it is to be again stressed that the drawings merely demonstrate but a few of the many matrices attainable in accordance with the present disclosure. For various forms of matrices, uses and a more generalized approach to matrix design, reference should be made to U.S. Patents No. 2,476,066 and No. 2,570,716, both assigned to the assignee of the present invention. Further, in some parts of the following disclosure, the term "input" may be applied to the control channels and the term "output" may be applied to selected lines. These terms are in accord with the usual relations, but are used for convenience and not to restrict the illustrative matrix circuits to such use as against their reverse translation where the input may appear at the individual lines. Still further, matrices or switching circuits presented on the well-known two-coordinate and three-coordinate notations systems will be detailed herein, but it is equally within the contemplation of the invention to extend the principles outlined to systems involving presentation on more than three coordinates.

Figure 1:
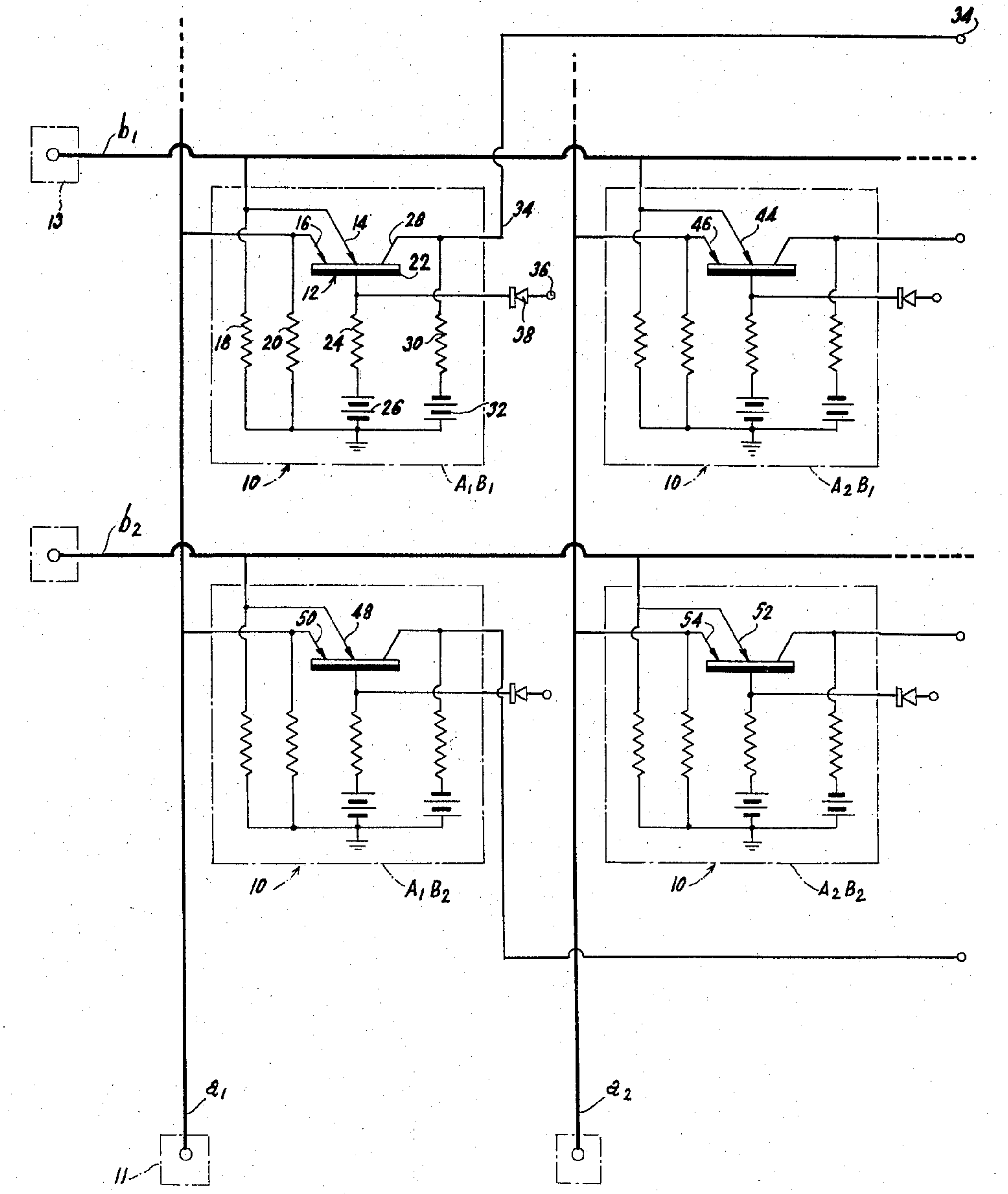
Fig. 1 is a diagrammatic block showing of a two-coordinate transistor matrix embodying features of the present invention, with a single matrix building section or selection circuit shown schematically.

Referring now specifically to Fig. 1, there is shown a generally rectangular transistor matrix presented on a two coordinate basis and embodying a number of similar transistor building blocks or selection circuits 10. The two-coordinates of the presentation are expressed by the notations $a_1$, $a_2$ . . . $a_n$, $b_1$, $b_2$ . . . $b_m$. As is well understood, any circuit or selection point in the rectangular matrix may be identified in the generalized case by the rectangular coordinates $a_n$, $b_m$. The notations *a*, *b* represent input or control signal sources 11, 13 appropriate to the design of the elemental building blocks or selection circuits 10. The input or control signals 11, 13 may be derived from further matrices or any other selection or logic circuits which may take the form of mechanical switches, vacuum tube switching circuits and transistor switching circuits.

The elemental building block 10 includes a current-multiplying transistor 12, preferably arranged for bistable operation between an "off" or "low-conduction" stable state and an "on" or "high-conduction" stable state. Each of the building blocks or selector circuits 10 is illustrated as a bistable current-multiplying transistor switching circuit. The circuit is designed by employing a low emitter impedance such that the emitter load line intersects the bistable characteristic in the negative emitter current region, corresponding to a positive resistance region, and a positive emitter current saturation region, corresponding to a further region of positive resistance. The transistor switching circuit 10 includes a transistor 12 having emitter electrodes 14, 16, with appropriate load resistances 18, 20 respectively connected to ground. The base electrode 22 of the switching transistor 12 is connected by a base load resistance 24 to an appropriate source of positive biasing potential 26. The collector electrode 28 is connected through to an appropriate load resistance 30 to a source of negative biasing potential 32, an output terminal or line 34 being connected to the collector electrode 28. In one form, the transistor 12 employs an N-type body of semiconductor and is triggered from the "on" or "high-conduction" state to the "off" or "low-conduction" state by the application of coincident negative pulses to the emitter electrodes 14, 16. Expressed in terms of logic function, this circuit arrangement is recognized as an "and" logic circuit on the low convention. In another form, the transistor 12 may employ a P-type body of semiconductor, and as such is switched from the "off" or "low-conduction" state to the "on" or "high-conduction" state by coincident positive signals applied to the multiple emitter electrodes 14, 16. Expressed in logic function, this circuit arrangement is likewise recognized as an "and" logic circuit based on the high convention.

The operation of the described bistable transistor switch, known per se, is such that only the application of coincidental pulses of a sign appropriate to the type of semiconductor body will cause switching or change of the transistor from one stable conduction state to another stable conduction state. Although the illustrated form is for a two-emitter transistor, commonly referred to as a tetrode, it can be appreciated that any number of emitter electrodes may be used compatible with transistor design considerations to obtain "and" logic circuits responsive to more than two concurrent or coincident signal inputs.

Switching of the circuit or building block 10 to the condition for sensing coincidence of further signals is accomplished by provision of a reset terminal or input 36 connected to the base via an isolating diode 38. For a transistor incorporating an N-type body of semiconductor material, reset is accomplished by applying a negative reset pulse at the base electrode 22 of the transistor 12 which is effective to switch the transistor from the "on" or "high-conduction" state back to the "off" or "low-conduction" state. Reset for a P-type semiconductor body is by application of positive reset pulses at the base electrode. Although individual reset terminals are provided for the respective stages, it will be appreciated that the reset may be from a common source of reset pulses appropriately coordinated to the input pulses applied at the signal inputs 11, 13.

In Fig. 1, there is shown a two by two transistor matrix with inputs $a_1$, and $a_2$ as one coordinate and inputs $b_1$, and $b_2$ as the other coordinate. The extension of the two by two matrix to the coordinate presentation with "*n*" elements for one coordinate and "*m*" elements for the other coordinate should be apparent to those skilled in the art from the following description. Specifically, each of the switching circuits 10 can be identified by its coordinates. Accordingly notations $A_1B_1$, $A_1B_2$, $A_2B_1$, and $A_2B_2$ are used to respectively designate the four units or switching circuit illustrated. In the interests of simplicity and clarity, only the respective emitter electrodes and their connection to the input circuits 11, 13 for the switching or selection circuits $A_1B_1$, $A_1B_2$, $A_2B_1$, and $A_2B_2$ are shown. Specifically, the switching or selection circuit $A_2B_1$ is seen to include emitter electrodes 44, 46, the switching or selection circuit $A_1B_2$ is seen to include emitter electrodes 48, 50, and the switching or selection circuit $A_2B_2$ is seen to include emitter electrodes 52, 54. Input $a_1$ is connected to a first set of emitter electrodes 16, 50 of units $A_1B_1$, and $A_1B_2$ while input $a_2$ is connected to electrodes 46, 54 of units $A_2B_1$ and $A_2B_2$. Input $b_1$ is connected to a further set of emitter electrodes 14, 44 of units $A_1B_1$, $A_2B_1$, while input $b_2$ is connected to electrodes 48, 52 of units $A_1B_2$ and $A_2B_2$. Thus, it will be seen that each of the switching or selection circuits has its emitter electrodes individually connected to the inputs of the appropriate coordinate of the presentation, based upon the two coordinate presentation initially adopted in design of the illustrated matrix. For example, if the output terminal or electrode selector circuit $A_2B_2$ is to be identified or selected, it is necessary that coincident negative inputs occur at the corresponding emitter electrodes 52, 54. As can be seen by the circuit connections of Fig. 1, this corresponds to coincident negative inputs at the coordinate input terminals $a_2$, $b_2$, the coordinate notation for the output to be selected. Although input $a_2$ is likewise applied to emitter electrode 46 of the circuit $A_2B_1$, it will be appreciated that the switching state of this circuit is not effected in that the emitter electrode 44 is not conditioned for conduction. Likewise, although the input $b_2$ is applied to emitter electrode 48 of unit $A_1B_2$, this circuit likewise is not conditioned in that emitter electrode 50 is not connected to a coincident signal input. Clearly then, the appropriate coordinate input for the selected stage of the matrix will not effect the conduction state of other stages or circuits of the matrix in that the required coincident emitter inputs will not be present at the other stages. Extension of this operation to a coordinate system of *n, m* bistable transistor circuits 10 should be obvious from the description of Fig. 1.

In order to more fully appreciate the logical extensions and many and diverse applications of the present disclosure, a typical pyramid transistor matrix will be described in conjunction with the diagrammatic showing of Fig. 2. In this figure there is shown a typical matrix which may be employed for selecting one of thirty-two lines under control of inputs to five control channels. Conversely setting of the five control channels to a predetermined pattern or switching combination as might be necessary for a binary function, will cause the application of a signal to a selected one of the thirty-two lines. As is understood, intermediate selections of signals may be made at various stages of the matrix.

The thirty-two output lines 201, 202–232 are enclosed within the triangle 200 and are each in the form of a tetrode transistor circuit 235 similar to the elemental building block 10 of Fig. 1. The output terminals or lines 201 to 232 inclusive are connected to the respective collector electrodes of the elemental transistor switching circuits 235. The pattern for connection of the respective pairs of emitter electrodes of each building block 235 in the final stage 200 is the same as set forth in connection with the detailed description of Fig. 1, with sixteen input lines coming from the first intermediate stage 400 and with two input lines coming from one of the five control channels of pairs, designated by the letters $e_1$, $e_2$.

The first intermediate stage 400 is illustrated as a four by four rectangular matrix having sixteen output lines 401 to 416 inclusive serving as the input lines to the final stage 200. Each of the switching circuits within the block 400, generally designated by the reference numeral 417, is similar to the elemental circuit 10 of Fig. 1. The four by four matrix 400 is an extension of the circuit shown in Fig. 1, with four lines as one coordinate input and four more lines as the other coordinate input. These lines come from two two by two matrices, 300, 300′, each of which is similar to the circuit shown in Fig. 1. The matrix 300 has output lines 301 to 304 serving as one coordinate input to the matrix 400, while the matrix 300′ has four output lines 301′ to 304′ serving as the other coordinate input to the matrix 400. Matrix 300 receives its input from the control channel $c_1$, $c_2$ and control channel $d_1$, $d_2$, while the matrix 300′ receives input from the control channel $a_1$, $a_2$, and control channel $b_1$, $b_2$. In reviewing the circuit of Fig. 2, it can be seen that the matrices 300, 300′ are rectangular, the matrices being controlled from line pairs $a_1$, $a_2$, and $b_1$, $b_2$ and line pairs $c_1$, $c_2$, and $d_1$, $d_2$. The outputs of the matrices 300, 300′ each of which includes a four wire set, serve as the coordinate inputs for the four by four matrix 400. The sixteen output lines of matrix 400, in conjunction with the further control channel or line pair $e_1$, $e_2$, are effective for selection of one of the thirty-two output lines 201–232.

Figure 2:
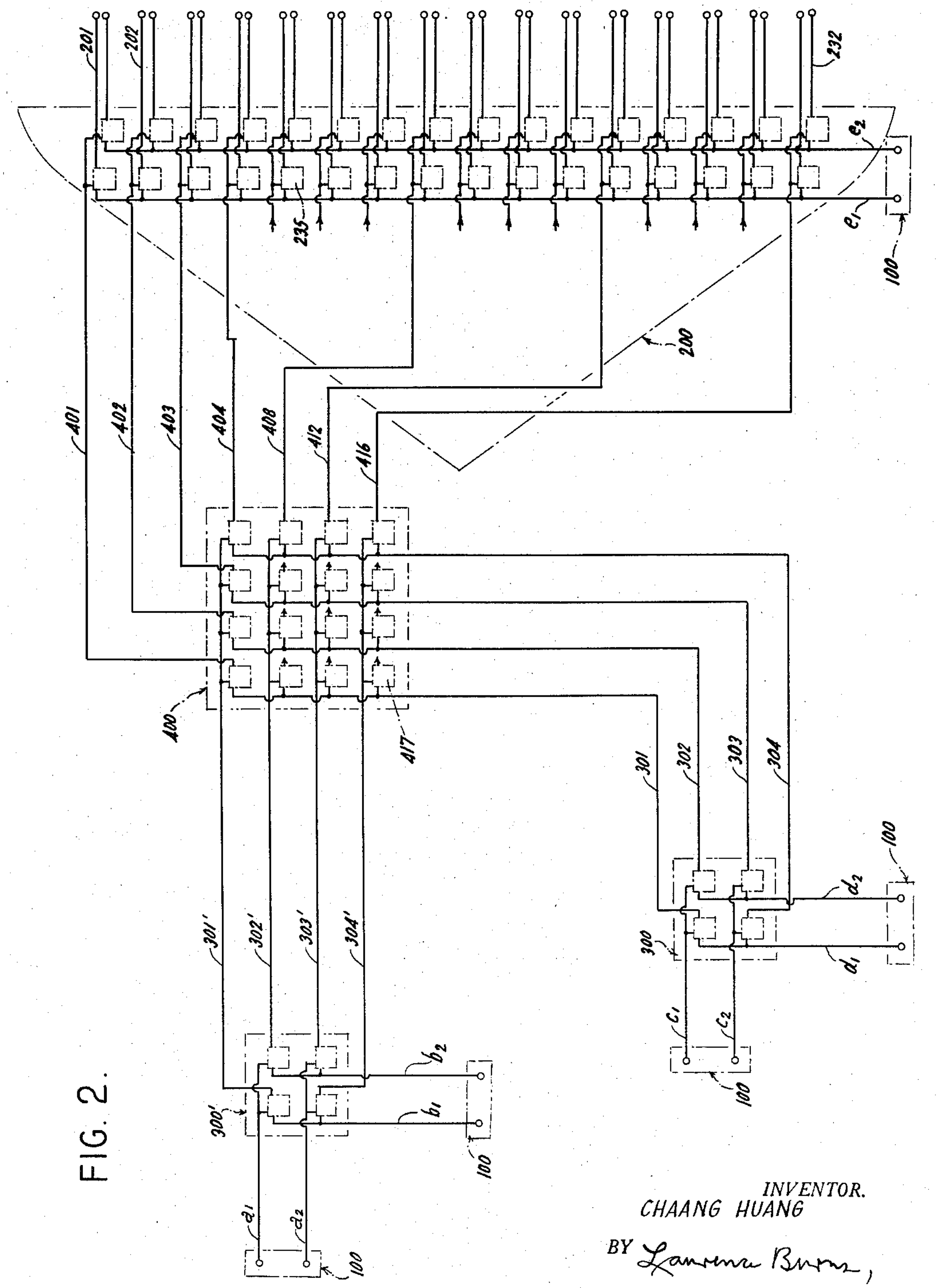
Fig. 2 is a block diagram of an illustrative five-channel, thirty-two line matrix illustrating principles of the present invention and incorporating the elemental transistor building section shown schematically in Fig. 1.

From the general description of Fig. 1, the operation of the matrix of Fig. 2 should be appreciated. Briefly, a typical switching sequence will be described for the binary input $a_1$, $b_2$, $c_2$, $d_2$, $e_2$. Coincident signal input at the lines $a_1$, $b_2$ of matrix 300′ will produce output on the line 302′. Coincident signal input at the terminals $c_2$, $d_2$ of the matrix 300 will produce output on the line 303. The thus produced signal inputs on lines 302′ and 303 will be applied at the emitter inputs of building block 417′ of intermediate matrix 400. This will produce output on the line 407. Output on the line 407 in conjunction with a coincident signal on the line $e_2$ of the final control pair will cause operation of the transistor building block 237′ of the final stage 200 and selection of the output line 214. Conversely, it will be appreciated that single binary switch setting to the exclusion of others may be obtained by selection of the output line 214.

In accordance with the disclosure of Figs. 1 and 2, it will be appreciated that two coordinate or planar matrices may be constructed for achieving a wide variety of storage and memory functions. These matrices can take the form of rectangular matrices, pyramid matrices, and various hybrids as will occur from consideration of this disclosure.

Figure 3:
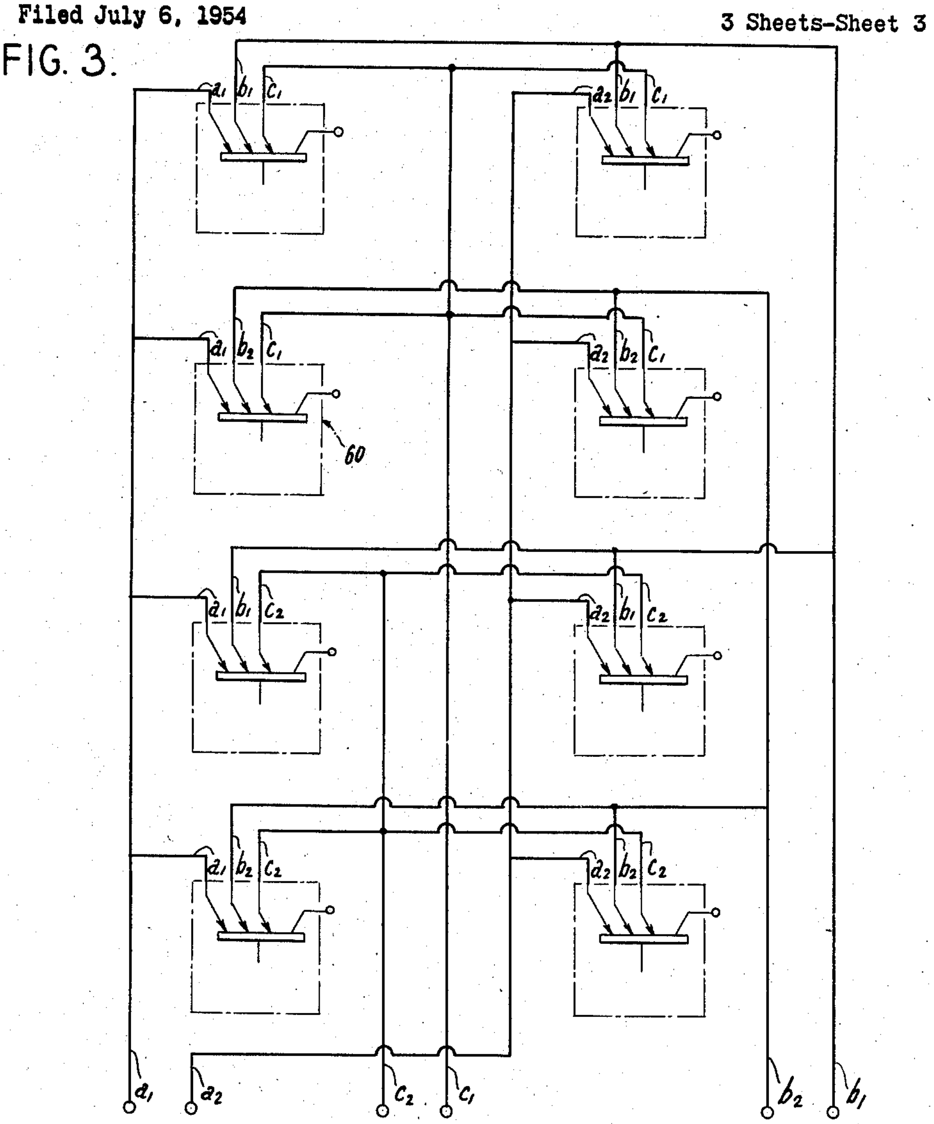
Fig. 3 is a block diagram of an illustrative three coordinate transistor matrix embodying features of the present invention.
Figure 4:
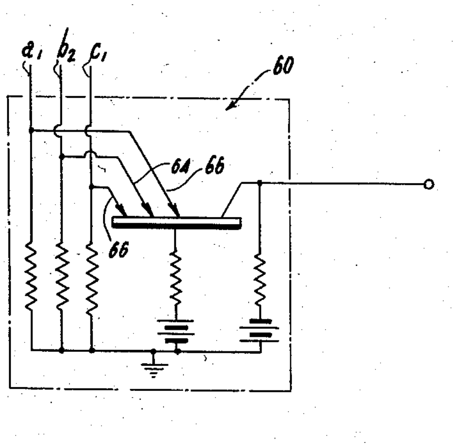
Fig. 4 is a schematic showing of an elemental building block or selection circuit for establishing a wide variety of three coordinate matrix presentations, such as shown in Fig. 3.

Reference will now be made to Figs. 3 and 4 which illustrate a cubic or three coordinate matrix demonstrating further features of the invention. From well understood principles of solid or analytical geometry a point in space or a switching point may be identified by three coordinates for example, $a_1$, $b_1$, $c_1$. With reference to A, B, C, axes in matrices embodying three coordinate identification, three concurrent signals must be present at a given switching point.

In accordance with this aspect of the invention, a further elemental building block 60, shown schematically in Fig. 4, is provided, incorporating a bistable transistor unit as previously described, but including three emitter electrodes 62, 64, 66 corresponding to coordinates $a_x$, $b_y$, $c_z$. Detailed description of the unit or elemental building block shown in Fig. 4 is deemed unnecessary since this unit functions in the same manner, as the unit 10, except that the unit 60 requires coincidence of three signal inputs at the respective emitter electrodes 62, 64, 66 for triggering the bistable transistor from one stable conduction state to the other stable conduction state. For example, employing an N-type semiconductor in the current-multiplying bistable transistor of the respective blocks 60, coincidence or simultaneous negative pulses must be applied to the emitter electrodes 62, 64, 66 to trigger the transistor from the "on" or "high-conduction" stable state to the "off" or "low-conduction" stable state. It will be appreciated that the transistor circuit simulates an "and" circuit connection considered on the low convention. Conversely, with a P-type body concurrent positive signals at the emitter electrodes 62, 64, 66 will cause the transistor to switch from the "off" or "low-conduction" stable state to the "on" or "high-conduction" stable state. It will be appreciated that the transistor circuit simulates an "and" circuit connection considered on the low convention. Conversely, with a P-type body concurrent positive signals at the emitter electrodes 62, 64, 66 will cause the transistor to switch from the "off" or "low-conduction" stable state to the "on" or "high-conduction" stable state, and in this sense function as an "and" circuit on the high convention.

In Fig. 3 there is shown a three-coordinate or cubic matrix which includes eight multiple emitter transistor building blocks, such as 60, having three sets of input terminals designated as $a_1$, $a_2$, and $b_1$, $b_2$, and $c_1$, $c_2$. Although the respective input terminals are shown as only being connected to a single emitter of one elemental building block or switching circuit, of the matrix, it should be understood that wherever the appropriate notation appears at the respective emitters of the eight stages or units of the matrix, there is a connection to the corresponding input terminal. In this respect, the matrix may be visualized as composed of the eight sets of coordinates necessary to define a cube in the A, B, C, coordinate system. The possibilities and manifest advantages of this multiple-coordinate presentation should be understood. With the illustrative matrix of Fig. 3, it is merely necessary to employ eight bistable stages each composed of a single transistor for selection and storaging on a three coordinate presentation with a possible selection of eight lines or signal outputs. Although Fig. 4 only illustrates the three coordinate matrix as applied to the simple cubic form, pyramids and hybrids will occur upon consideration of the foregoing disclosure as well as by reference to synthesis techniques.

It will be recognized from the foregoing that matrices are here involved where multiple-emitter transistors constitute cross-over or switching points which operate according to "and" logic functioning. Both two-emitter and three-emitter embodiments have been described, in each instance involving transistors operating according to the "and" logic concept. In each instance the emitters are close to each other and to the collector for interaction in the usual manner involved in transistor operation. However, in broader concept the matrices may be constructed so as to carry our "and" logic operations using multiple rectifying connections to a common biased output point. Multiple rectifying connections polarized alike from several respective input points to an output point can replace a single transistor at the switching point in each instance, with broad similarity in functioning, albeit with appreciable circuit complication. Certain advantages are however realized in such alternative system over prior art diode matrices, especially in the novel provision of three dimensional matrices and higher order matrices.

Although the invention has been described with emphasis on computer aspects and applications, it is to be understood that the many matrices which may be established are adapted to radio telegraphy and telephony functions without departing from the basic spirit of simplicity. The use of the elemental multiple-emitter bistable building blocks, whether in the computing fields or in this application to intelligence transmission lends itself to reliability, stability, and compactness, considered of course on a relative basis as to the complexity of the required selection and storage operations.

From the foregoing disclosure of illustrative embodiments of the invention, those skilled in the art will readily find varying applications of the invention and various further modifications thereof will be readily apparent. Accordingly, the appended claims should be interpreted broadly, consistent with the spirit and scope of the invention.

What is claimed is:

1. A semiconductor circuit for multiple-coordinate identification of plural lines comprising a bistable current multiplying transistor selection circuit for each of said lines including a transistor having a semiconductor body, a base electrode, multiple emitter electrodes and a collector electrode, said collector electrode being connected to one of said lines, respective input circuits having individual connections to first sets of emitter electrodes of said selection circuits as one coordinate of said multiple-coordinate identification, and respective input circuits having individual connections to second sets of emitter electrodes of said selection circuits as a second coordinate of said multiple-coordinate identification, the parameters of each of said selection circuits being related to provide output at its collector electrode upon switching of the selection circuit from one stable state to the other stable state in response only to coincident signal inputs at its multiple-emitter electrodes.

2. A semiconductor circuit for two-coordinate identification of plural lines comprising a bistable current-multiplying transistor selection circuit for each of said lines including a transistor having a semiconductor body, a base electrode, two-emitter electrodes and a collector electrode, said collector electrode being connected to one of said lines, respective input circuits having individual connections to first sets of emitter electrodes of said selection circuits as one coordinate of said two-coordinate identification, and respective input circuits having individual connections to second sets of emitter electrodes of said selection circuits as a second coordinate of said two-coordinate identification, the parameters of each of said selection circuits being related to provide output at its collector electrode upon switching of the selection circuit from one stable state to the other stable state in response only to coincident signal inputs at its two-emitter electrodes.

3. A semiconductor circuit for three-coordinate identification of plural lines comprising a bistable current-multiplying transistor selection circuit for each of said lines including a transistor having a semiconductor body, a base electrode, three-emitter electrodes and a collector electrode, said collector electrode being connected to one of said lines, respective input circuits having individual connections to first sets of emitter electrodes of said selection circuits as one coordinate of said three-coordinate identification, respective input circuits having individual connections to second sets of emitter electrodes of said selection circuits as a second coordinate of said three-coordinate identification, and respective input circuits having individual connections to third sets of emitter electrodes of said selection circuits as a third coordinate of said three-coordinate identification, the parameters of said selection circuit being related to provide output at said collector electrode upon switching of the selection circuit from one stable state to the other stable state in response only to coincident signal inputs at the multiple-emitter electrodes of a particular selection circuit.

4. A matrix-building component comprising a semiconductor circuit including a transistor having a semiconductor body, a base electrode, multiple emitter electrodes and a collector electrode on said body, individual input circuits connected to respective emitter electrodes, each of said input circuits being arranged to provide a signal serving as one coordinate of a multiple-coordinate system for identifying said collector electrode, means for providing back conducting bias to said collector electrode with respect to said base electrode, means biasing said multiple emitter electrodes with respect to said base electrode, the parameters of said transistor and said input, base and output circuits being related to provide an input characteristic having respective regions of positive resistance separated by a region of negative resistance, said means biasing the emitter electrodes maintaining stable operation of said transistor in one positive resistance region, said semiconductor circuit serving as an "and" logic circuit for switching of the transistor from operation in said one positive resistance region to operation in the other positive resistance region only in response to coincident signal inputs at said multiple emitter electrodes.

5. A matrix-building component comprising a semiconductor circuit including a transistor having a semiconductor body, a base electrode, two emitter electrodes and a collector electrode on said body, individual input circuits connected to respective emitter electrodes, each of said input circuits being arranged to provide a signal serving as one coordinate of a multiple-coordinate system for identifying said collector electrode, means for providing back conducting bias to said collector electrode with respect to said base electrode, means biasing said two emitter electrodes with respect to said base electrode, the parameters of said transistor and said input, base and output circuits being related to provide an input characteristic having respective regions of positive resistance, separated by a region of negative resistance, said means biasing the emitter electrodes maintaining stable operation of said transistor in one positive resistance region, said semiconductor circuit serving as an "and" logic circuit for switching of the transistor from operation in said one positive resistance region to operation in the other positive resistance region only in response to coincident signal inputs at said two emitter electrodes.

6. A matrix-building component comprising a semiconductor circuit including a transistor having a semiconductor body, a base electrode, three emitter electrodes and a collector electrode on said body, individual input circuits connected to respective emitter electrodes, each of said input circuits being arranged to provide a signal serving as one coordinate of a multiple-coordinate system for identifying said collector electrode, means for providing back conducting bias to said collector electrode with respect to said base electrode, means biasing said three emitter electrodes with respect to said base electrode, the parameters of said transistor and said input, base and output circuits being related to provide an input characteristic having respective regions of positive resistance, separated by a region of negative resistance, said means biasing the emitter electrodes maintaining stable operation of said transistor in one positive resistance region, said semiconductor circuit serving as an "and" logic circuit for switching of the transistor from operation in said one positive resistance region to operation in the other positive resistance region only in response to coincidental signal inputs at said three emitter electrodes.

References Cited in the file of this patent

UNITED STATES PATENTS

| | | |
|---|---|---|
| 2,595,208 | Bangert | Apr. 29, 1952 |
| 2,627,039 | MacWilliams | Jan. 27, 1953 |
| 2,666,150 | Blakely | Jan. 12, 1954 |
| 2,670,445 | Felker | Feb. 23, 1954 |
| 2,673,293 | Eckert et al. | Mar. 23, 1954 |
| 2,677,725 | Schuler | May 4, 1954 |
| 2,736,880 | Forrester | Feb. 28, 1956 |

FOREIGN PATENTS

| | | |
|---|---|---|
| 693,726 | Great Britain | July 8, 1953 |